Aug. 11, 1970     L. A. ATTERMEYER     3,523,851
WAY PLUG INSTALLATION
Filed June 19, 1967
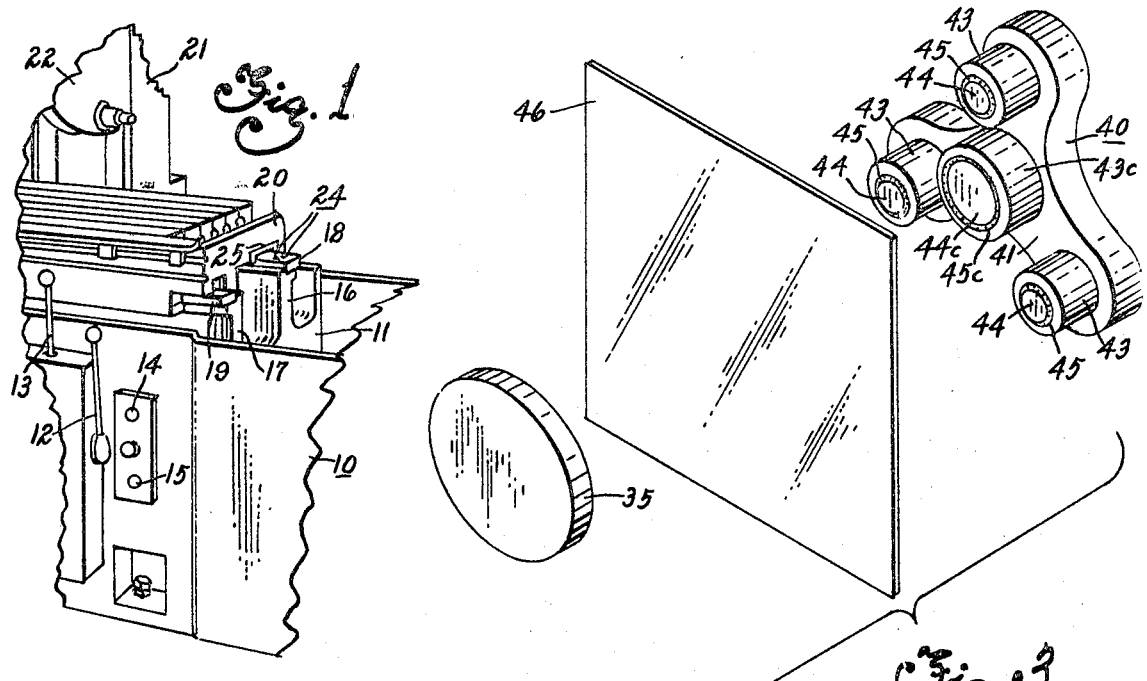
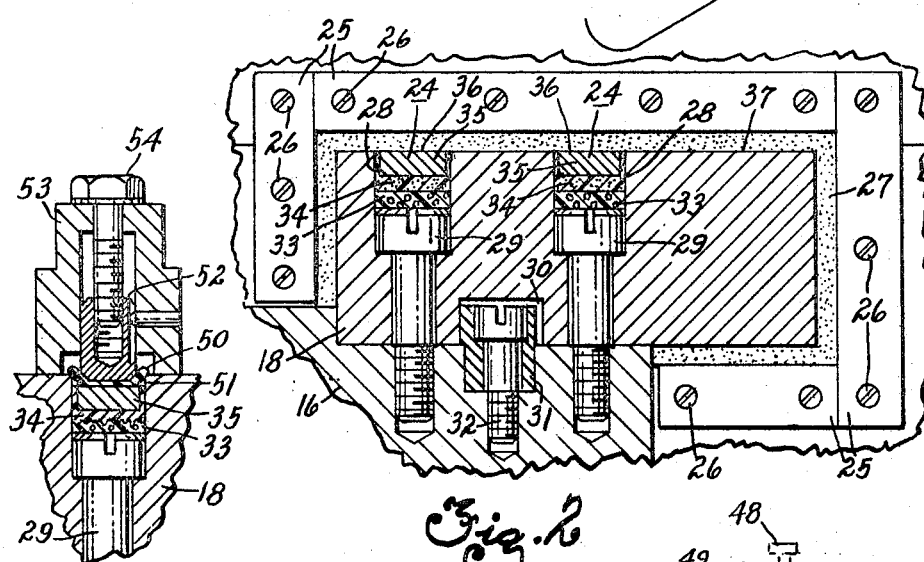
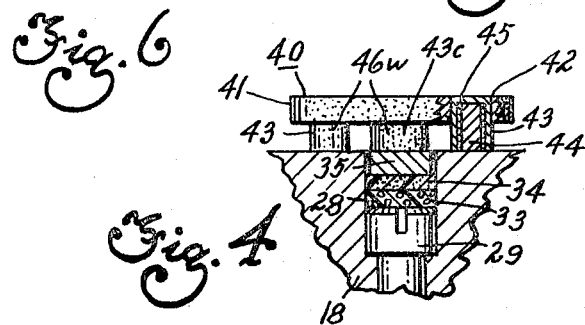
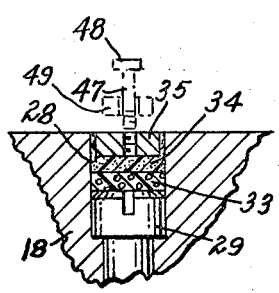
INVENTOR.
LAWRENCE A. ATTERMEYER
BY *Howard F. Keiser*
*Albert H. Reuther*
ATTORNEYS United States Patent Office 3,523,851
Patented Aug. 11, 1970

3,523,851
WAY PLUG INSTALLATION
Lawrence A. Attermeyer, Cincinnati, Ohio, assignor to The Cincinnati Milling Machine Co., Cincinnati, Ohio, a corporation of Ohio
Filed June 19, 1967, Ser. No. 647,043
Int. Cl. B32b
U.S. Cl. 156—344             11 Claims

ABSTRACT OF THE DISCLOSURE

An apparatus and method for a way plug installation (and removal) into holes through which fastening means are installed for securing machine tool ways to machine tools wherein a filler material member in the hole acts as a seal to confine a curable adhesive means and the adhesive means retains a magnetic plug. A magnetic tool holding means is utilized for holding the magnetic plug for a sufficient period of time to permit setting of the adhesive means and to assure accurate coplanar relationship of a subsequently exposed way plug end and the way surface.

---

This invention relates to machine tools, and, more particularly, to installation of way plugs and improved structural arrangement thereof to realize cost savings over hand finishing of closed or covered holes.

During the manufacture of machine tools, need exists for accuracy in way or bearing surfaces having screw heads, bolts or fastening means in various locations. For example, a sliding table or saddle movement occurs along ways or bearing supports carried on a milling machine bed or machine tool base portion. Previously, a solid metal or brass plug has been forced into openings or holes resulting from headed bolt or fastening installations to secure machine positioning of such ways. Application of such force by pounding or other impact causes undesirable deformation and possible distortion at least of the surrounding area of the way. Therefore, attempts to avoid force at times result in the use of solid plastic plugs of material such as acetals, nylon, or polycarbonate resins. However, heated metal chips or shavings tend to become imbedded in exposed plastic ends, and cuts or dirt traps result from metal particles temporarily imbedded in the ends of such solid plastic plugs. Accordingly, the present invention avoids these previous difficulties and provides a new and improved way plug installation which assures the advantages of accuracy without deformation and distortion of finely finished ways or bearing surfaces.

This invention also discloses a way plug installation having a non-metallic filler portion fitted directly over a bolt head or fastening means. A layer of curable adhesive means is located directly on the non-metallic filler means. The adhesive means peripherally oozes around a magnetic metal disc or axially short way plug with an exposed end having a surface absolutely coplanar with that of a finely finished way or bearing surface.

Way plug installations of this invention include non-metallic filler portions exemplified by cork, porous "star" foam of light plastic, polyurethane, eastomeric, or similar rubbery materials chemically made in a well-known manner. A predetermined layer of adhesive means exemplified by epoxy is located as a shelf directly on the non-metallic filler portion. The cured epoxy adhesive means as the shelf surrounds all but an exposed axial end of a short magnetic metal disc or plug having an exposed end surface thereof held in a pre-set position that assures coplanar relationship with the finely finished way or bearing surface area surrounding the disc or plug.

A further advantage of this invention is in providing way plug installations including the method steps of stamping out a piece of non-metallic filler material such as rubber or plastic polyurethane foam into a predetermined configuration, shoving the filler material into a hole of the machine tool way having surface accuracy of necessity, pouring curable adhesive means such as epoxy over the filler material and also into the hole, magnetically holding an undersized plug of magnetic material while simultaneously providing a parting agent such as by spraying wax or positioning an insulating layer exemplified by cellophane, saran wrap, wax paper and the like between the magnetic material plug and a magnetic tool means, maintaining magnetic tool means holding of the plug for a predetermined period of time to permit setting of the adhesive means as a shelf, assuring coplanar relationship of a subsequently exposed plug end and accurate way surface, and removing the magnetic tool means to leave the plug in proper coplanar position as closing off the hole in the way.

In addition, this invention provides a way plug installation including method steps of sequentially filling a fastener hole partially with an insulating material, adhering an undersized plug of pre-ground steel immune to hot metal chips in the fastener hole, magnetically holding the plug with a triangular arrangement of permanent magnet means having a fourth permanent magnet means substantially centrally located (through all four permanent magnet means having predetermined accurate coplanar face or end relationships), maintaining three point permanent magnet and way engagement during simultaneous central magnetic holding of the steel disc during final cure adhering of epoxy adhesive means, and removing the permanent magnet means. Subsequent optional removal of the way plug to gain access to the fastener hole, if desired, may be accomplished manually by either a drill and tap operation or by means of an adhesive in conjunction with a block and puller fixture.

In summary, this invention provides a machine tool way plug installation composed of a non-metallic filler material member which axially abuts the top surface of the fastening means; a curable adhesive means which is poured onto the filler material and into the way hole; and a plug of magnetic material which is placed into the hole and into axially and circumferentially abutting relationship with the adhesive means, with the plug being held by a magnetic tool holding means during curing of the adhesive to assure accurate coplanar relationship of the way plug end and the way surface. In the alternative, the curable adhesive means is precoated on the plug or in the hole.

In addition, this invention provides a machine tool way plug installation method including the steps of placing a filler material in a way plug hole; pouring a curable adhesive over the filler material; placing and magnetically holding a magnetic plug into axially and circumferentially abutting relationship with the adhesive; maintaining the magnetic holding sufficiently long to allow setting of the adhesive and assure accurate coplanar relationship of the way plug end and the way surface; and removing the magnetic holder to thus close off the way hole. Subsequent removal of the way plug if desired may be accomplished manually by either a drill and tap operation or by means of an adhesive in conjunction with a block and puller fixture.

Other features and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the drawings:

FIG. 1 is a fragmentary perspective view of a machine tool means having or bearing structure provided with features in accordance with the present invention.

FIG. 2 is a fragmentary cross-sectioned elevational view of the way structure of FIG. 1 and showing features in accordance with the present invention.

FIG. 3 is an exploded perspective view representing features of way plug installation in accordance with the present invention.

FIG. 4 is a fragmentary cross-sectioned elevational view further representing features of way plug installation, also in accordance with the present invention.

FIG. 5 is a view similar to FIG. 4 and represents an optional drill and tap operation for manual removal for a way plug installation in accordance with the present invention.

FIG. 6 is a view also similar to FIG. 4 and represents an optional way plug removal tool utilizing an adhesive block, screw and puller fixture in accordance with the present invention.

FIG. 1 shows a machine tool means generally indicated by numeral 10 and including a bed or base portion 11. Suitable control levers 12 and 13 as well as operating buttons 14 and 15 are provided on one side of the bed in a well-known manner. The bed 11 includes upwardly extending portions 16 and 17. Each of the upwardly extending portions 16 and 17 carries a way 18 and 19 respectively. A reciprocally movable table 20 is movable along the ways 18 and 19 in a predetermined path accurately maintained due to precision manufacture of the ways. A suitable carrier 21, as well as a head stock 22, are shown in the fragmentary view of FIG. 1. It is to be understood that the actuation of the table 20 occurs in a well-known manner.

The machine tool means 10 represented in FIG. 1, has way plug installation generally indicated by numeral 24 including features in accordance with the present invention. Reference is made to FIG. 2 in which greater detail is shown as to the fastening means and way plug installation as applied to the way 18, for example. Suitable heat treat or surface hardening of the ways is provided in a well-known manner and a bracket or clamping means 25 with suitable screw fasteners 26 can be provided to maintain positioning of a suitable wiping material 27 of pliable fabric plastic. Such wiping material 27 per se can be made of leather, felt, or other simulated wiper material such as neoprene, preferably immune to any deterioration due to provision of lubricant, as well as due to the possible shavings or chips of metal resulting from operation of the cutter or tooling on the machine.

In accordance with the present invention the problems of closing holes or passages 28 in the way are overcome so as to conceal and close off such holes through which suitable fastening means or screw-headed bolts 29 are installed for securing the way 18 to the upwardly extending portion 16 of the machine tool bed 11. Each way has a longitudinally extending recess or rectangular cavity 30 in which a key 31 is engageable along at least one side thereof. Such a key is secured by a suitable screw-headed fastening or bolt 32. The way plugs or installations having a combination of features in accordance with the present invention are usable in vertical as well as horizontal and intermediate positions of ways. Also, it is to be understood that circular, as well as elongated or longitudinally extending ways can be fitted with the way plug installations in accordance with the present invention. The holes 28 are cleaned of foreign material or debris. A cylindrical foam plastic or rubbery member 33 is made by stamping from a sheet of polyurethane or elastomer, for example. It is to be understood that cork, rubber or other suitable filler material is also suitable for members 33. These filler members or portions 33 are shoved into the holes 28 and into axially abutting engagement with the screw-headed bolts 29 as represented in FIG. 2. Then a pouring of epoxy or other curable adhesive means 34 into the holes 28 occurs. The same adhesive means 34 is precoated if deemed necessary to a metal disc or steel plug 35, having a finely finished surface 36 thereon. This finely finished surface 36 of the plugs 35 is adapted to complement surfacing 37 of the way 18 in accurate coplanar relationship. Way plug spacing, for example, at a value of two inches between centers is used for a 1.250 inch plug. To meet such a spacing requirement, a triangular-shaped fixture or inserting tool means generally indicated by numeral 40 in FIGS. 3 and 4 is provided in accordance with the present invention. This insertion tool 40 includes a substantially triangular shaped handle or body portion 41 of suitable non-magnetic material exemplified by aluminum machined into the predetermined configuration. Suitable cavities or holes 42, as represented in FIG. 4, are provided in each of three extremities or legs of the triangular-shaped body portion 41. In each of the three extremities or corners of the triangular-shaped body portion 41, a permanent magnet means of alnico, for example, has a mounting provided by a substantially cylindrical cup-shaped outer steel housing portion 43 into which a centrally fitted permanent magnet means 44 is secured and maintained in spaced relationship by a suitable insulating material 45. The outer housing or cup 43, permanent magnet means 44, and insulating material 45 have concentric relationships to assure optimum magnetic flux distribution and magnet strength available in each of the three corners or legs of the triangular-shaped body portion 41. FIG. 3 provides a perspective view of the magnetic tool means 40 and an elevational view together with a cross section of the magnetic structure in one corner thereof can be seen in FIG. 4. A substantially centrally located and slightly larger diameter magnet means in a housing 43c is also carried by the body portion 41. Another alnico or other permanent magnet member 44c is centrally maintained by an annular insulating portion 45c, as seen in FIG. 3. An insulating sheet of transparent material 46 is shown in FIG. 3 to illustrate one way of assuring against adhesive covering or adhesive contamination on the coplanar end surfacing of the manget means carried by the tool 40. Such a transparent sheet of material 46 is exemplified by cellophane or saran wrap, as well as waxed paper and the like. As an economy measure, further in accordance with the present invention, a spray wax coating 46w is applied directly on the magnet means and housings of the tool means 40 represented in FIG. 4. Thus, adhesive or epoxy material 34 is kept from contaminating the contiguous end surfacing of the metal way plug 35 of magnetic material as centrally positioned relative to the substantially central magnet means carried by the tool 40. During retention of the way plug 35 by the magnet means 44c, it is possible to coat adhesive material onto the exposed periphery and end surface of the way plug 35 which is then held magnetically in position within the confines of the hole 28. During such magnetic positioning of the way plug 35, the adhesive means or epoxy material 34 oozes peripherally around the way plug 35 and any excess adhesive means is readily removable from the waxed surfacing of the magnet means and/or the plastic sheet 46.

During magnetic positioning of the way plug 35 in a particular hole 28, triangular spacing of the remaining three magnet means is such that accurate coplanar relationship is maintained during set or curing of the adhesive means for a time interval such as 20 minutes, for example.

The adhesive means or epoxy material 34 in effect forms a shelf for support of the steel way plug 35 that is surrounded on all but an exposed end surface thereof. The coplanar arrangement of the magnet means including the three triangularly located outer magnets, as well as the fourth substantially centrally located magnet means assure proper positioning of the way plug 35 in each hole 28. A "nested" relationship is readily established. The end surfaces or facing of each of the magnet means is accurately ground into a coplanar relationship therebetween. A minimum amount of cleaning of adhesive means from such waxed periphery of the magnet means and/or use of the sheet materials 46 facilitates the re-use of the tool means 40. Any excess adhesive means or epoxy which oozes axially outwardly around the periphery of the way plug 35, once installed in the opening or hole 28, is readily removed by a suitable hand tool or chisel-like operation. Removal of adhesive means by such a hand tool operation is carried out considerably more economically than removal of distorted metal from a way which, of necessity, must have accurate surfaces.

The way plug 35 is provided with an accurately ground surface or side which faces the magnet in a substantially centered relationship thereto during positioning of the tool means 40 to have a three point support on the way 18 during installation using the particular holding fixture having features in accordance with the present invention.

Removing the tool means after the epoxy has been permitted to cure or acquire setting is readily accomplished. The spray wax or sheet material achieves the purpose of keeping the adhesive means or epoxy off the fixture or tool means 40. Thus, adherence of the epoxy or bonding of the fixture to the plug and ways is eliminated. Excess epoxy flashing is readily scraped away and the magnetic tool means or fixture 40 is usable for repeated installations of way plugs in predetermined locations to realize a cost saving over the hand finishing of previously known solid metal or plastic plug closures of holes.

FIG. 5 represents an additional feature of the present invention in that the way plug 35 is readily drilled in an intermediate location thereof together with fitting thereto a tap tool or puller device 47 having a handle or nut assembly 48 and weight 49, for example, such that removal of the way plug 35 is readily accomplished. The filler member and the adhesive means are quickly removable to permit access to the screw, bolt or fastening means 29 in the hole 28. FIG. 6 represents a further feature of the present invention in that way plug 35 is removable by depressing it slightly, such as 1/32 of an inch, for example, to break adhesive bond 34, pouring a small amount of curable adhesive means 50 into the resulting recess 51, setting a puller plug 52 into adhesive means 50 and allowing it to set. The puller plug 52, having way plug 35 attached thereto by adhesive 50, is subsequently removed by a puller-fixture means 53, 54. Thereupon, the adhesive and filler means 33, 34 are exposed and may be quickly removed to allow access to bolt fastening means 29.

As recited previously, the way plug installation in accordance with the present invention is useful for closing holes for fastening means of ways in horizontal as well as vertical axes. Thus X, Y, and Z axis way plug installation is feasible where anti-friction slides are required. Suitable clamping and guide bearings by means of a gib or fitting plate can be used in a well-known manner.

While the invention has been described in connection with possible forms or embodiments thereof, it is to be understood that the present disclosure is illustrative rather than restrictive and that changes and modifications may be resorted to without departing from the spirit of invention or scope of the claims which follow.

What is claimed is:

1. A way plug installation into holes through which fastening means are installed for securing machine tool ways to machine tools comprising:
   (a) a non-metallic filler material member axially abutting the top surface of the fastening means;
   (b) a curable adhesive means; and
   (c) an undersized plug of magnetic material which is held in the hole by the adhesive means in a manner to assure accurate coplanar relationship of the exposed way plug end surface and the way surface.

2. The way plug installation of claim 1 wherein the undersized magnetic plug is pre-coated on at least one surface thereof with the adhesive means prior to being placed in the hole.

3. The way plug installation of claim 1 wherein the magnetic plug is held by a magnetic tool holding means for a sufficient period of time to permit setting of the adhesive means.

4. The way plug installation of claim 3 wherein the magnetic tool holding means comprises:
   (a) a substantially triangular body of non-magnetic material; and
   (b) a plurality of permanent magnets, one mounted in each of the three body extremities, as well as a fourth substantially centrally located magnet, with all four permanent magnets having predetermined accurate coplanar faces whereby three-point permanent magnet and way surface engagement is maintained while simultaneously centrally holding the magnetic way plug during the curing of the adhesive means.

5. A way plug installation into holes through which fastening means are installed for securing machine tool ways to machine tools comprising:
   (a) a non-metallic filler material member axially abutting the top surface of the fastening means;
   (b) a curable adhesive means which is poured onto the filler material and into the hole; and
   (c) an undersized plug of magnetic material which is placed into the hole and into axially and circumferentially abutting relationship with the adhesive means in a manner to assure accurate coplanar relationship of the exposed way plug end surface and the way surface, whereby the filler material member acts as a seal to confine the curable adhesive means and the adhesive means acts as a shelf for the magnetic plug.

6. The way plug installation of claim 5 wherein the non-metallic filler is comprised of elastomeric material.

7. The way plug installation of claim 5 wherein the non-metallic filler is comprised of plastic foam material.

8. A way plug installation into holes through which fastening means are installed for securing machine tool ways to machine tools, comprising the method steps of:
   (a) placing a non-metallic filler material into a hole of predetermined size in a machine tool way and over the fastener;
   (b) pouring a curable adhesive means over the filler material and also into the hole;
   (c) placing and holding, with a magnetic tool means, an undersized plug of magnetic material into the hole and into axially and circumferentially abutting relationship with the adhesive means;
   (d) maintaining the magnetic tool holding means for a sufficient period of time to permit setting of the adhesive means as a shelf and assuring accurate coplanar relationship of a subsequently exposed way plug end surface and the way surface; and
   (e) removing the magnetic tool holding means to leave the plug of magnetic material in accurate coplanar position, thereby closing off the hole in the way.

9. The method of claim 8 wherein step (c) is performed while simultaneously providing a parting agent between the plug of magnetic material and the magnetic tool means.

10. The method of claim 8 including the additional final step of removing any adhesive means which has oozed around the periphery of the way plug.

11. A removal method for adhesively retained way plugs from holes on machine tool ways, comprising the steps of:
(a) depressing the plug to break the adhesive bond;
(b) pouring a curable adhesive means into the resulting recess;
(c) setting a puller plug into the adhesive means and allowing it to cure; and
(d) removing the puller plug, having the way plug attached thereto, by a puller-fixture means.

References Cited

UNITED STATES PATENTS 2,305,076  12/1942  Graham _____ 29—427

SAMUEL FEINBERG, Primary Examiner

U.S. Cl. X.R.

29—427